Figure 2:
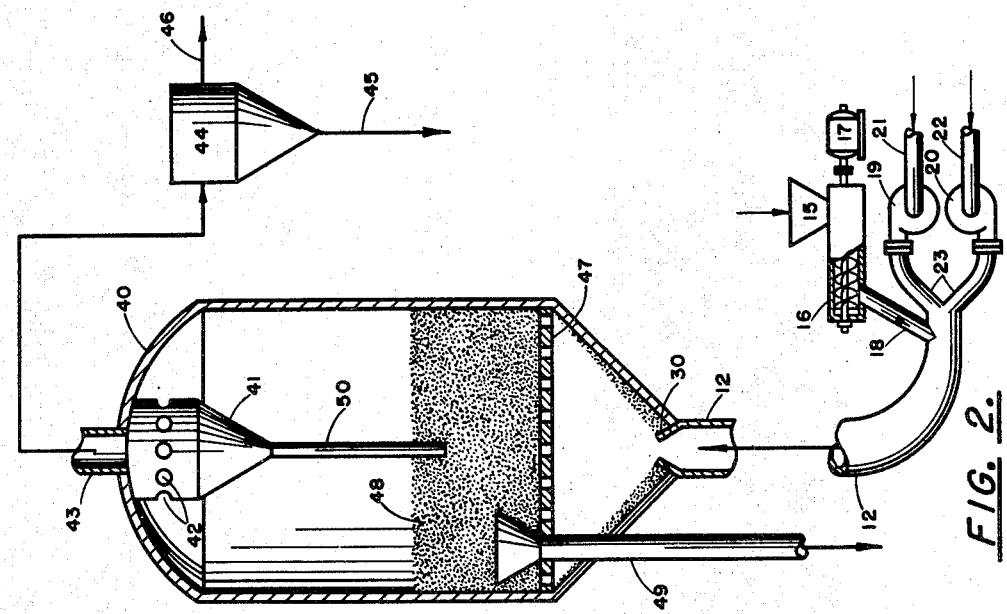

April 24, 1951     J. S. PALMER     2,550,374

METHOD FOR HANDLING SUSPENSIONS

Filed July 1, 1944

Jewell S. Palmer INVENTOR.

BY

J. D. McKean
ATTORNEY.

Patented Apr. 24, 1951

2,550,374

UNITED STATES PATENT OFFICE 2,550,374

METHOD FOR HANDLING SUSPENSIONS

Jewell S. Palmer, Wooster, Tex., assignor to Standard Oil Development Company, a corporation of Delaware Application July 1, 1944, Serial No. 543,172

3 Claims. (Cl. 23—1)

The present invention is directed to a method for handling suspensions of finely divided solids in a gasiform vehicle or medium. In its more specific aspects, the present invention is directed to a method for handling suspensions of the character employed when treating organic materials with finely divided catalysts, as when cracking petroleum fractions in the presence of a powdered catalyst.

In the so-called "fluid catalyst" cracking units at present employed in the refining of petroleum fractions, a solid catalyst is employed with the particles finely divided and having a particle diameter ranging from 20 to 80 microns. The complete refining unit includes a number of vessels, such as reactor and regenerator vessels, and large quantities of the powdered catalyst are circulated through the unit by forming a suspension of the powdered catalyst with air, steam or hydrocarbon vapor as the carrying medium or vehicle, and blowing the suspension through the closed system. Difficulty has been encountered in handling this suspension, particularly in the regenerators and reactor vessels. Such a vessel is customarily quite large and is installed at a substantial height above the surface of the earth, and a suspension of solids in a gasiform medium is discharged into the lower end of the vessel as feed. Within the vessel itself the powdered catalyst is maintained in suspension as a phase of considerably greater density than the stream discharged into the vessel. Fluctuations in the velocity of the stream discharged into one of these large vessels allows powdered catalyst to drop downwardly from the vessel into the inlet line when the pressure in the inlet line diminishes and causes the dense catalyst phase to be returned to the large vessel when the pressure in the inlet line is increased. This phenomenon is described as drop-back of catalyst into the inlet line, and its recurrence at intervals causes excessive back pressures in the inlet line, with a resultant vibration of substantial magnitude of both the inlet line and the vessel fed by the inlet line. In addition, the drop back of the catalyst into the inlet line has resulted in excessive erosion of the line.

As a specific example, a regenerator unit was fed with a suspension of catalyst and air, with the air compressed by means of two blowers in parallel. As long as both of the blowers were in operation the velocity of the suspension flowing through the inlet line was sufficient to prevent undue fluctuation of density of suspension in the inlet line, but when, for any reason, one of the blowers stopped, the velocity of the suspension was not sufficient to prevent drop back of catalyst in the inlet line and caused excessive vibration in the system until the other blower could be put back into service.

In accordance with the present invention a system for handling a suspension including a large vessel with a vertical inlet line discharging into the vessel and a plurality of mechanical units for supplying the gaseous medium used in forming the suspension is provided with a throat of reduced flow area immediately adjacent the reactor vessel to eliminate drop back of catalyst into the inlet line when one of the means supplying the gaseous material for the suspension is taken out of service. The area of the opening of the throat is proportioned to maintain the velocity of flow at no less than approximately 12 feet per second when one of the mechanical units supplying the gaseous medium is taken from service in order to eliminate catalyst drop back into the inlet line.

Figure 1:
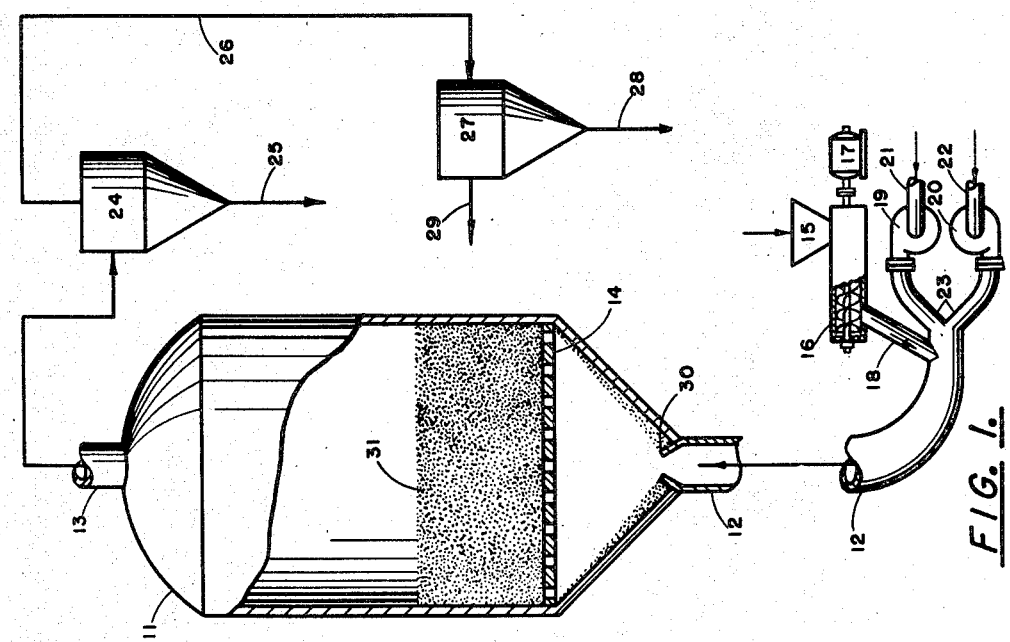

The invention will now be further explained by reference to the drawing, in which:

Fig. 1 is an elevation, partly in section, of a catalyst regenerator known as the upflow type and showing connecting inlet and outlet units; and Fig. 2 is an elevation, partly in section, of a catalyst regenerator known as a downflow type, with connecting inlet and outlet apparatus.

Turning now specifically to the drawing, and first to Fig. 1, a reactor vessel is designated by 11 and is provided with an inlet line 12, discharging upwardly into the lower end of the vessel, and an outlet line 13 connected to the upper end of the vessel. It will be seen that the vessel is of a generally cylindrical shape, with its lower end in the shape of a frustrum of a cone to connect with the smaller diameter inlet line 12. A perforated partition 14 is arranged transversely in the vessel immediately above the lower conical section in order to produce an increase in velocity of flow of the suspension at this point to cause the maintenance of a dense phase in the reaction chamber above the partition plate.

The major portion of inlet 12 is vertical, but at its lower end it makes a right angle turn to enable spent catalyst to be injected therein, with the spent finely divided catalyst being fed downwardly from hopper 15 into a conveyor including screw or worm 16 and motor 17 or other suitable means for introducing the catalyst into line 18, and the conveyor discharging into line 12 by means of conduit 18. Air is supplied for admixing with the injected solid by means of blowers 19 and 20, connected in parallel. Blower 19 is provided with inlet 21, and blower 20 is provided with inlet 22, and both blowers discharge into manifold 23, which in turn discharges into inlet line 12.

The regenerated catalyst is withdrawn as a suspension in the gas through outlet 13 and discharged into a cyclone 24, where the major portion of the regenerated catalyst is removed through outlet 25 and the gas with the remaining catalyst suspended therein is removed through outlet 26 and passed to a Cottrell precipitator 27, where the remainder of the catalyst may be discharged through line 28 and the waste gases removed through line 29.

The proportions of the apparatus described are such that the velocity of the suspension flowing through line 12 when both blowers are operating at normal speed is of the order of 18 feet per second. In order to insure a sufficient velocity of flow of the discharge end of line 12, when one blower is taken out of service, a restricting cone 30 is placed at the discharge end of line 12, where the suspension is discharged into the regenerator vessel. The flow area of cone 30 is from ½ to ¾ the area of line 12 and insures the maintenance of a minimum velocity of 12 feet per second when one of the blowers is taken out of service. This arrangement prevents the formation of a dense phase in the line 12. The dense phase is indicated in the drawing by the cross-hatching in the reactor vessel 11, immediately above plate 14, along the sides of cone 30, and is designated by numeral 31. It will be understood that the density of the suspension in inlet line 12 and in outlet line 13 is approximately the same, but that the velocity of flow in vessel 11 is of the order of $1/10$ to $1/15$ that in the inlet and outlet lines, and consequently the suspension is much denser in this portion of the apparatus.

It is to be understood that the restriction at the inlet of vessel 11 is not necessarily limited to the shape of a cone. As alternative arrangements an orifice plate provided with one or a number of orifices to define a flow area from ½ to ¾ that of the flow area of inlet line 12 may be employed, or, if desired, a Venturi shaped throat may be used.

Another embodiment of the application of the present invention is shown in Fig. 2. In this figure, an apparatus is shown for regenerating catalyst which is designated as a downflow catalyst regenerator unit. The regeneration step is conducted within a shell 40, which is similar in shape to shell 11 of Fig. 1. That is to say, shell 40 is of a general cylindrical shape, with its lower end tapering to allow it to connect with the inlet line. The inlet line for the downflow catalyst regenerator unit of Fig. 2 may be identical with that of Fig. 1 and provided with the same means for supplying finely divided solid catalyst suspended in a gaseous stream as that described in Fig. 1. Accordingly, the means for feeding the catalyst and the blowers for supplying air under pressure for suspending the catalyst are shown exactly the same as in Fig. 1 and are designated by the same numerals and the description of these parts of the apparatus will not be repeated.

The downflow regenerator unit of Fig. 2 is arranged to cause separation within the unit of the major portion of the regenerated catalyst from the gaseous medium. The removal of the major portion of solids from the gaseous suspending agent is accomplished by placing a cyclone 41 in the upper portion of shell 40, with inlet ports 42 leading into the cyclone and an outlet line 43 for withdrawing the gases having a small portion of the finely divided solid suspended therein. The major portion of the finely divided solid is dropped back to the dense phase through a sealed dip leg 50, which extends into the dense phase. The outlet line 43 discharges into Cottrell precipitator 44, where the remainder of the solid is separated from the gases and removed via line 45, while the gases are discharged through outlet 46. A transverse perforated plate 47 is arranged in the lower portion of the tower immediately above the tapering section and serves to maintain the dense phase of the suspension above this point under normal operating conditions. The dense phase is indicated by shading and designated by numeral 48. Regenerated catalyst is withdrawn from the portion of the tower in which the dense phase accumulates by means of discharge line 49, which pierces plate 47 and extends downwardly through the wall of vessel 40. The regenerated powdered catalyst may be removed via line 49 without the withdrawal of appreciable amounts of gases therewith.

The throat of inlet line 12, discharging into shell 40, is provided with a restricting cone 30, having an effective flow area of from ½ to ¾ the flow area of the inlet line 12. With blowers 19 and 20 of such size as to produce a velocity of flow of approximately 18 feet per second through line 12 under normal conditions, the restriction in the throat maintains the velocity of flow at this point at no less than approximately 12 feet per second if one of the blowers is removed from service and prevents the migration of the dense phase downwardly into pipe 12.

Thus, the restricting cone 30 defines an area of flow no greater than the area of flow of the conduit 12 times the velocity of one less than the plurality of streams divided by the velocity of said plurality of streams.

As a specific example of the application of the present invention, a downflow catalyst regenerator unit similar to that of Fig. 2 was supplied through an inlet line 90 inches in diameter. Two blowers, having a combined capacity under normal operations of approximately 50,000 cubic feet per minute were arranged to supply air to the inlet line and carried along with the air in the inlet line was approximately 55 tons of powdered catalyst per minute. Under normal operations with two blowers in service, the velocity through the inlet pipe was approximately 18 feet per second, but when one of the blowers was removed from service the velocity was reduced to approximately 9 feet per second and set up fluctuations in pressure in the inlet line, which in turn caused vibrations of the order of 6 inches in both the inlet line and the regenerator vessel. The vertical length of the inlet line was approximately 60 feet and the regenerator vessel had a diameter of approximately 42 feet and a height of 60 feet. The potential danger of the vibration caused by the drop back of the catalyst into the inlet line with a unit of such size will be evident. This unit was altered by placing in inlet line 12 at the throat of the reaction vessel a restricting cone having a flow area 76 inches in diameter. This restriction in area maintained a flow velocity at the throat of over 13 feet per second when one blower was taken out of service and eliminated the migration of the dense phase of the suspension downwardly into the inlet pipe when, for any reason, one blower was removed from service, and eliminated the setting up of large magnitude vibrations in the system.

Having fully described the present invention, what I desire to claim is:

1. A method for maintaining a finely divided solid in suspension in a gasiform fluid which comprises forming a plurality of streams of a gasiform fluid the individual velocities of which are such as to give a combined velocity of flow when combined of approximately 18 feet per second, forming a suspension of a finely divided solid in said streams of gasiform fluid, and flowing said suspension through a conduit into a reaction zone through an area of flow, said area of flow being no greater than the area of flow of the conduit times the velocity of one less than the plurality of streams divided by the velocity of said plurality of streams.

2. A method in accordance with claim 1 in which the finely divided solid comprises particles having diameters in the range between 20 and 80 microns.

3. A method in accordance with claim 1 in which the gasiform fluid is air.

JEWELL S. PALMER.

REFERENCES CITED

The following references are of record in the file of this patent:

UNITED STATES PATENTS

| Number | Name | Date |
| --- | --- | --- |
| 2,305,569 | Degnen | Dec. 15, 1942 |
| 2,322,075 | Tipon | June 15, 1943 |
| 2,366,372 | Voorhees | Jan. 2, 1945 |
| 2,411,208 | Hall et al. | Nov. 19, 1946 |
| 2,421,212 | Medlin | May 27, 1947 |
| 2,421,651 | Reeves | June 3, 1947 |